United States Patent [19]
Butler et al.

[11] Patent Number: 4,824,253
[45] Date of Patent: Apr. 25, 1989

[54] GLASS DRIVER FOR LASER MIRROR

[75] Inventors: Alfred L. Butler; Robert A. Chechile, both of Thousand Oaks, Calif.

[73] Assignee: Litton Systems, Inc., Beverly Hills, Calif.

[21] Appl. No.: 35,809

[22] Filed: Apr. 8, 1987

[51] Int. Cl.⁴ ............................................. G01C 19/64
[52] U.S. Cl. .................................... 356/350; 372/107
[58] Field of Search ......................... 356/350; 372/107

[56] References Cited

U.S. PATENT DOCUMENTS 3,533,014 10/1970 Coccoli et al. .
4,281,930 8/1981 Hutchings .
4,348,113 9/1982 Bonfils .
4,410,274 10/1983 Ljung .
4,410,276 10/1983 Ljung et al. .
4,691,323 9/1987 Ljung et al. ....................... 356/350

Primary Examiner—Vincent P. McGraw
Assistant Examiner—S. A. Turner
Attorney, Agent, or Firm—Nilsson, Robbins, Dalgarn, Berliner, Carson & Wurst

[57] ABSTRACT

A device for driving a mirror of a laser cavity has a deflectable body which matches the mirror in coefficient of thermal expansion and acts in response to forces from one or more piezoelectric elements. The piezoelectric elements deflect a membrane of the driver body which acts on the mirror in an axial direction to control the path length of the cavity. In a preferred embodiment, the driver body is made of a low expansion glass-ceramic or fused quartz material and has a peripheral ring and an inner hub for transfer of deflection forces to the mirror in either of two opposite directions.

21 Claims, 3 Drawing Sheets

GLASS DRIVER FOR LASER MIRROR

BACKGROUND OF THE INVENTION

The present invention relates generally to a structure for deflecting a mirror of a laser cavity and, more particularly, to a path length control device having a driver with a deflectable membrane portion and a coefficient of thermal expansion which matches the coefficient of an associated mirror.

Ring laser gyros are typically equipped with one or more transducer-controlled mirrors to compensate for thermal expansion of the gyro body and maintain the path length constant over an operating temperature range. The range of mirror motion must be sufficiently broad to permit acquisition of a resonant mode of the gyro cavity and to compensate for expansion or contraction of the gyro block. In the case of a 28-centimeter gyro having a block of Zerodur or other suitable glass-ceramic material, two transducer-controlled mirrors must move up to 25 microinches (0.64 microns) to acquire an operating mode and up to an additional 110 microinches (2.79 microns) to compensate for expansion or contraction of the gyro block over a range of $-40$ degrees to $+90$ degrees Celsius. Thus, it is necessary to provide for at least 135 microinches (3.43 microns) of mirror movement in a typical 28-centimeter gyro.

Many transducer-controlled mirrors are of the membrane type, in which a central reflective surface is mounted to a deflectable glass-ceramic or quartz membrane for movement in a preselected axial direction. Piezoelectric transducer elements are used to deflect such mirrors in response to an electric signal derived in part from the output of the gyro.

Prior devices for "driving" membrane-type mirrors in a deflection mode have typically been composites of different materials, some of which have coefficients of thermal expansion much larger than the coefficients of the mirrors themselves. This can cause serious problems. For example, a common form of driver has a plurality of piezoelectric elements positioned directly behind and in contact with a central reflective portion of a mirror membrane to displace the reflective portion in response to an electrical input. Such devices are disclosed in U.S. Pat. Nos. 4,281,930; 4,410,274 and 4,410,276. In these devices, thermal expansion or contraction of the piezoelectric elements produces extraneous mirror movement for which the feedback system must compensate. This reduces the degree of compensation available to counteract expansion and contraction of the gyro block and reduces the temperature range over which the gyro can operate. The problem is aggravated by the fact that piezoelectric elements typically have coefficients of thermal expansion hundreds of times as great as the materials from which gyro mirrors and gyro blocks are made.

Another known device for deflecting a mirror of a ring laser gyro is illustrated in FIGS. 5A and 5B, wherein a pair of piezoelectric elements 10 and 12 are carried on opposite sides of a membrane 14 of a metallic driver body 16 to deflect the driver in response to an electrical input. The metallic driver body is mounted to the back side of a mirror body 18 made of low expansion glass by a plurality of finger elements 20. The finger elements extend axially from the membrane 14 and are rigidly attached to a cylindrical ring 22 of the mirror. Deflection forces are applied to the mirror by an axial driver screw 24 which acts through a backing plate 25 to bear on a central hub 26 and move a reflective surface portion 28 of the mirror. Thus, an electrical input applied to the piezoelectric elements 10 and 12 causes the screw 24 to move axially and displace the reflective surface portion in the axial direction.

The structure of FIGS. 5A and 5B eliminates errors due to thermal expansion of the piezoelectric elements but causes other thermal errors. The metallic driver body 16 expands more than the low expansion glass of the mirror body 18 and thus introduces thermal effects requiring compensation. The amount of mirror motion required to compensate for this can be as high as 45 microinches (1.143 microns), which must be designed into the device along with the required motion of at least 135 microinches (3.43 microns) for a 28-centimeter gyro. In addition, differential expansion produces asymmetric distortion and accompanying output errors when the driver body 16 is slightly off center relative to the mirror 18 or when the cement holding the finger elements 20 to the cylindrical ring 22 is not applied uniformly.

Other problems with the device of FIGS. 5A and 5B can be traced to the screw contacting the hub of the mirror. The screw applies a preset bias to the mirror 18 and can move laterally relative to the surface of the mirror in use. The screw can even "unload" relative to the mirror in high frequency operation, resulting in a loss of mirror control and possible chipping of the contacted surface.

It is therefore desirable to provide a path length control device having reduced thermal and vibrational effects and low gyro error. It is also desirable to provide a path length control device having a high capacity for compensation and a large operating temperature range.

SUMMARY OF THE INVENTION

The present invention relates to a device for controlling path length in a laser cavity, such as that of a ring laser gyro, by deflection of a membrane-type mirror to move a reflective surface of the mirror in a preselected axial direction. The device includes: a driver body which matches the mirror in coefficient of thermal expansion and has a membrane portion capable of deflection in the axial direction and a hub portion coupled to the membrane portion to transmit deflection forces to the mirror; and at least one transducer associated with the membrane portion for axial deflection of the membrane portion and the mirror in response to an electrical input. In a preferred embodiment, the driver body is made of "low expansion glass", i.e., a glassy material such as glass-ceramic or fused quartz which has a very low coefficient of thermal expansion. The driver body also may have a peripheral portion comprising a substantially continuous ring extending axially from the driver membrane portion to the periphery of the mirror structure. The inner hub portion preferably comprises a glass-ceramic or quartz post which extends axially from the driver membrane portion and is rigidly attached to the mirror structure for transmission of deflection forces in opposite directions.

The driver of the present invention substantially eliminates the thermal expansion effects of prior art devices. This is due to the unique structure of the driver and the fact that it is made of the same low expansion material as the mirror. Because the driver is made of a very low expansion material, its own expansion and contraction do not detract from the range of motion available to compensate for thermal changes in the body. The composition and structure of the driver also eliminate stress and distortion due to differential expansion between the mirror and the driver. Precision centering of the driver on the mirror and attachment of the driver at exactly the same location around the periphery of the mirror are not critical in the device of the invention because the mirror and the driver expand at the same rate.

Other advantages of the device are lower weight, higher strength and greater rigidity than the multifingered metallic device of FIGS. 5A and 5B. Greater rigidity permits the driver to operate at high frequencies, as does the fact that its central hub is a post which is rigidly attached to the mirror assembly. Attachment of the driver hub to the mirror assembly eliminates chatter and "unloading" of the driver during vibration and eliminates the need to preload the driver. The result is a highly precise and highly efficient transducer able to operate over a wide temperature and frequency range.

BRIEF DESCRIPTION OF THE DRAWINGS

The above and other features of the invention may be more fully understood from the following detailed description, taken together with the accompanying drawings, wherein similar reference characters refer to similar elements throughout and in which.

DESCRIPTION OF THE PREFERRED EMBODIMENTS

Figure 1:
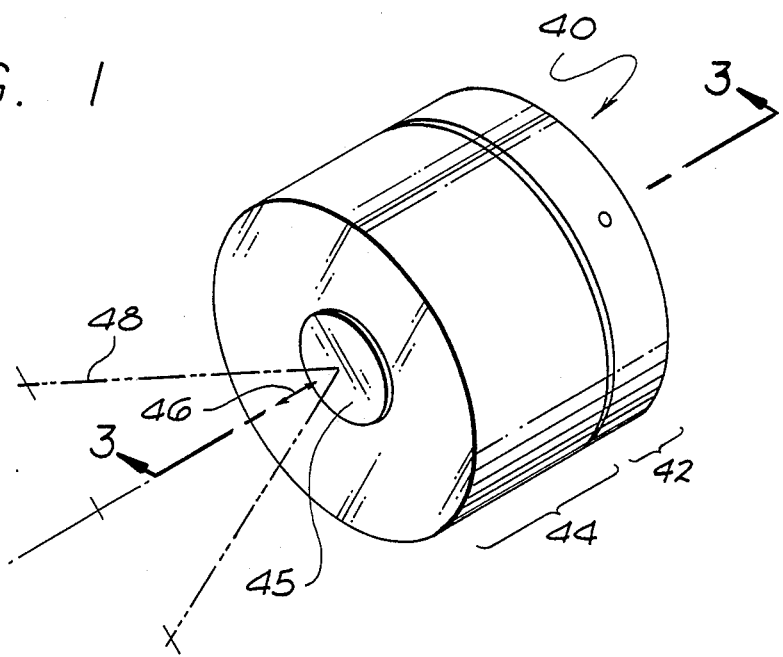
FIG. 1 is an isometric view of an exemplary embodiment of a path length control device constructed in accordance with the invention.
Figure 2:
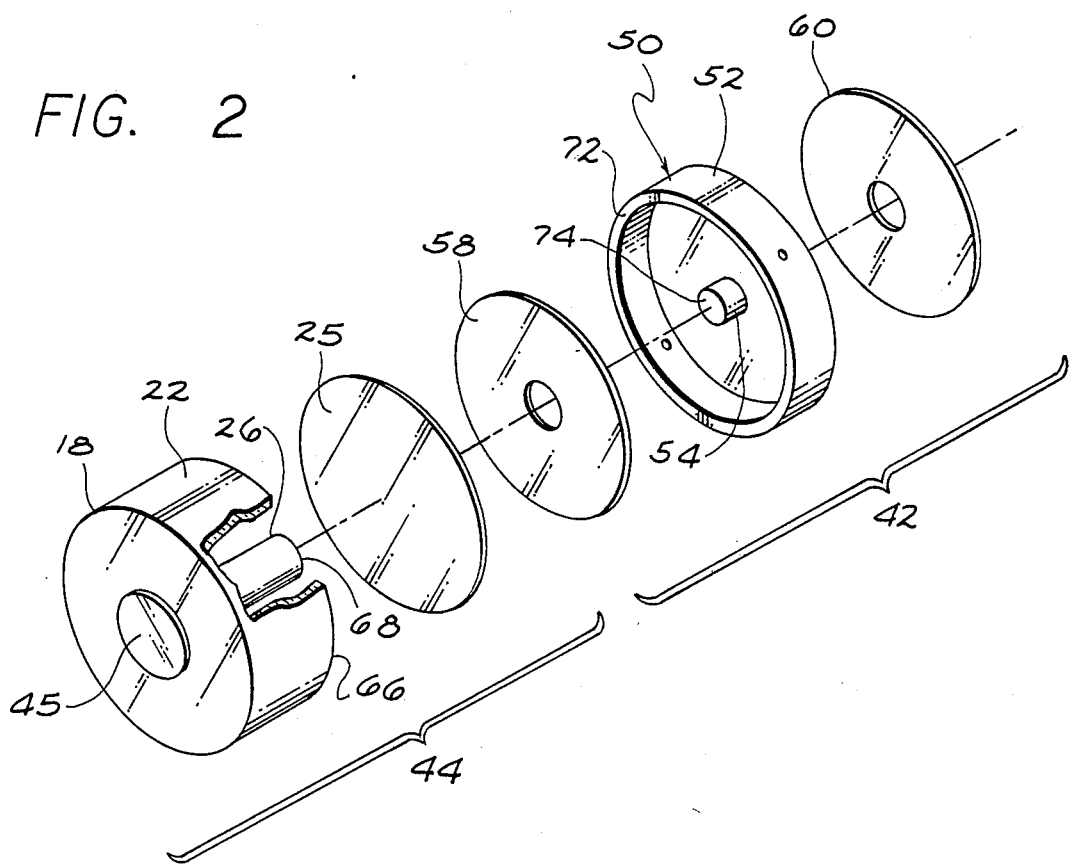
FIG. 2 is an exploded isometric view of the device of FIG. 1.
Figure 3:
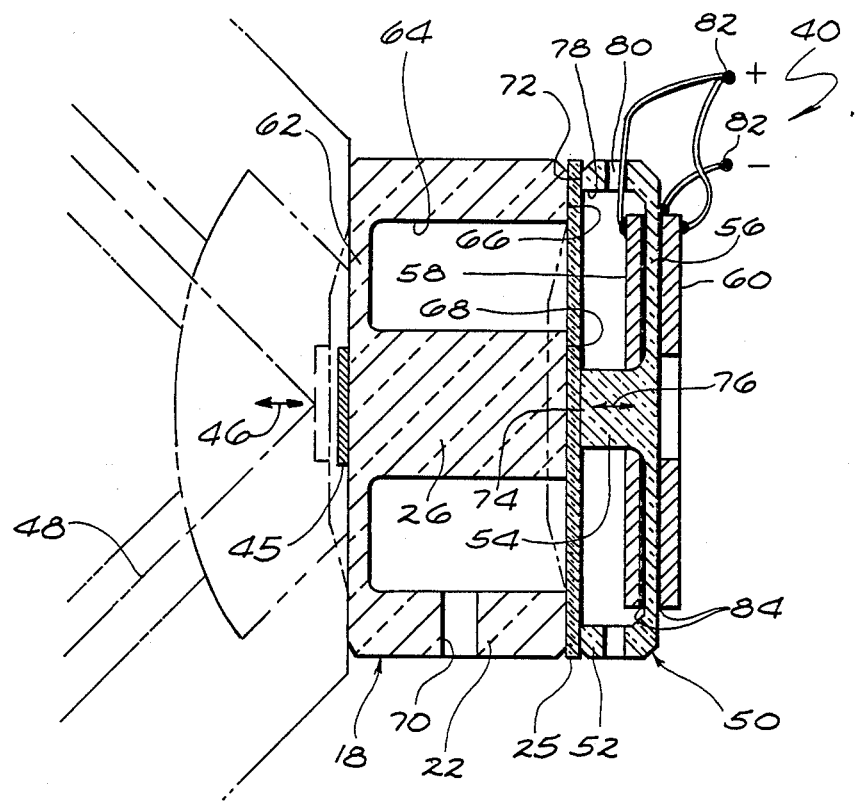
FIG. 3 is a cross-sectional view, taken along the line 3—3 of FIG. 1, showing a portion of an associated ring laser gyro block in phantom lines.

Referring now to the drawings, specifically FIGS. 1-3, one form of path length control device 40 constructed in accordance with the invention has a driver 42 which acts on a mirror assembly 44 of low expansion glass to move a reflective surface 45 in a preselected axial direction 46 and thus vary the effective path length of a pair of counterpropagating laser beams 48. The driver 42 comprises a membrane-type driver body 50 rigidly attached to the mirror assembly 44 by way of a peripheral ring 52 and an inner hub or post 54. The peripheral ring 52 and the inner hub 54 are connected by a driver membrane portion 56 which deflects axially under the influence of first and second piezoelectric elements 58 and 60, respectively.

The driver body 50 is made entirely of the same low expansion glass as the mirror assembly 44 to which it is connected, drastically reducing the effects of temperature on the device and precluding differential thermal expansion between the driver body and the mirror assembly. Because the driver body is a membrane-type structure with piezoelectric elements located only on the surfaces of the membrane portion 56, thermal expansion or contraction of the piezoelectric elements does not produce mirror movement.

As used herein, the term "low expansion glass" means any glassy material having a coefficient of thermal expansion and other relevant properties satisfactory for use in a membrane-type mirror and/or the body of a ring laser gyro. Such materials include glass-ceramics, such as those available, commercially under the names Zerodur and Cervit, which typically contain between 70 and 75 percent by weight of the crystalline phase with the structure of high temperature quartz. "Fused quartz" is an another such material which is made up entirely of quartz and having a slightly higher thermal expansion coefficient.

Figure 5A:
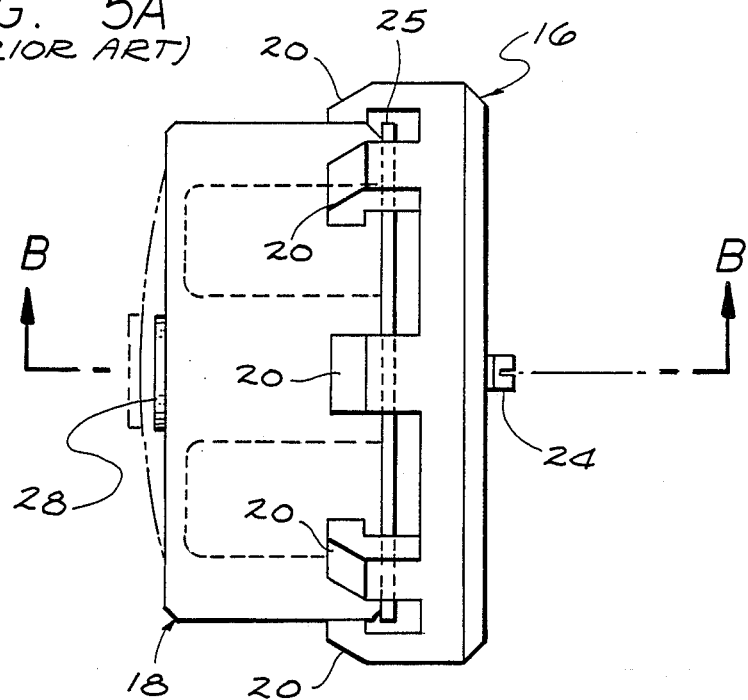
FIG. 5A is a side elevational view of a path length control device of the prior art.
Figure 5B:
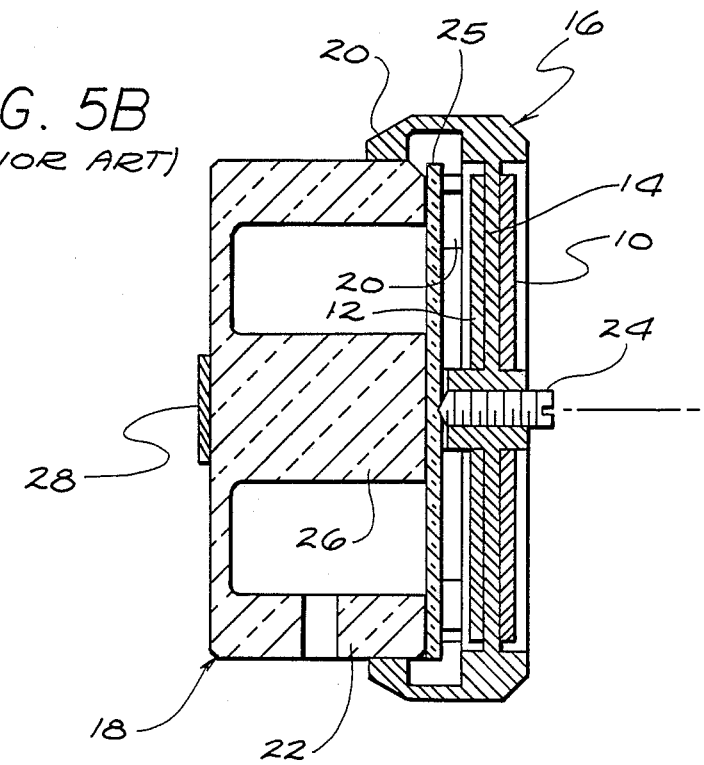
FIG. 5B is a cross-sectional view taken along the line 5B—5B of FIG. 5A.

The path length control device 40 benefits from the fact that the inner hub 54 of the driver body 50 is rigidly attached to the mirror assembly 44, preferably by a suitable adhesive, rather than bearing against the mirror with a screw as shown in FIGS. 5A and 5B. This obviates the need for biasing or "loading" of the hub 54 against the mirror assembly and prevents the hub from coming out of contact with the mirror at high frequencies.

Referring specifically to FIG. 3, the mirror assembly 44 is made up of a membrane-type mirror body 18 and a circular backing plate 25 which are identical to the corresponding elements of FIG. 5B. Thus, the mirror body 18 has a cylindrical outer ring 22 and a central hub 26 which extends from one side of a mirror membrane portion 62 in a direction parallel to the axis 46. The body of the mirror defines an annular cavity 64 behind the membrane portion 62, causing the membrane portion to be compliant and thus deflect in the direction 46 when subjected to axial stress. The outer ring 22 and the central hub 26 of the mirror body terminate in an annular surface 66 and a circular surface 68, respectively, which are coplanar in the disclosed embodiment. The backing plate 25 is rigidly affixed to the surfaces 66 and 68 by adhesive or otherwise (not shown) to close the cavity 64 and restrain the central hub 26 from radial movement. One or more air holes 70 are provided in the cylindrical outer ring 22 to vent the annular cavity 64 during operation.

In the embodiment of FIG. 3, the driver body 50 is essentially the same diameter as the mirror body 18 and is rigidly affixed to the opposite side of the backing plate 25 in alignment with the mirror body. A terminal annular surface 72 of the peripheral ring 52 and a terminal circular surface 74 of the inner hub 54 are affixed by adhesive or otherwise (not shown) to the backing plate 25 for application of deflection forces to the mirror assembly 44. Deflection of the driver membrane portion 56 is transmitted to the mirror assembly 44 to produce axial movement of the reflective mirror surface 45, as indicated in FIG. 3 at 76. A deflected condition of the driver body 50 and the mirror assembly 44 is indicated in broken lines. During such deflection it is desirable to vent the annular cavity 78 of the driver body 50 to the atmosphere and to provide access for electrical connection to the piezoelectric element 58 within the cavity. This is accomplished by one or more holes 80 in the peripheral ring 52 of the driver body.

The piezoelectric elements 58 and 60 are preferably of the $d_{31}$-type and are disposed upon the driver membrane 56 in a manner causing one of them to expand and the other to contract when an electrical input is applied to a pair of terminals 82. In the embodiment illustrated, the piezoelectric elements are "poled" in the same direction but connected so that voltage is applied to them in opposite directions. The elements 58 and 60 are rigidly attached to conductive coatings 84 which are connected electrically together and to one of the terminals 82. This attachment can take the form of soldering, electrostatic fusion or an epoxy coating sufficiently thin to permit conduction of electricity. The opposite (outer) sides of the piezoelectric elements 58 and 60 are then connected by soldering or otherwise to leads of the terminal 82 of opposite polarity.

Although the polarities of the elements 58 and 60 are preferably in the same direction, one of the polarities may be reversed if the electrical connection scheme is modified to apply potentials in the same direction across the piezoelectric elements. In either case, a suitable electrical input at the terminals 82 causes one of the elements to expand and the other to contract, providing the desired deflection of the driver membrane 56. It is assumed for purposes of this discussion that the piezoelectric elements 58 and 60 are provided from the manufacturer with conductive electrodes on opposite sides thereof, as encountered with many commercially available piezoelectric discs. Such electrodes facilitate contact with the coatings of the driver membrane 56 and soldering of leads from the second terminal 82.

In operation, a suitable electrical input is applied to the terminals 82, causing one of the piezoelectric elements to expand and the other to contract. This deflects the driver membrane 56 and thus the inner hub 54 of the driver body in one of the directions indicated at 76. Because the surfaces 72 and 74 of the driver body are rigidly affixed to the backing plate 25, as are the surfaces 66 and 68 of the mirror body 18, this deflection is transmitted through the central hub 26 of the mirror body to move the reflective surface 45 in the corresponding axial direction 46. When the electrical input is such that the piezoelectric element 58 expands and the piezoelectric element 60 contracts, the driver body 50, the backing plate 25 and the mirror body 18 deflect to the broken line condition of FIG. 3 to shorten the path length of the laser beam 48. When the polarity of the electrical input is reversed, the driver body 50, the backing plate 25 and the mirror body 18 deflect in the opposite direction, increasing the path length. Because the driver body 50 and the mirror assembly 44 are made of the same material, which is preferably a very low-expansion glass-ceramic material such as that available commercially under the designations Zerodur or Cervit, there is virtually no thermal expansion of the device 40 over an operating temperature range. Equally important, there is no differential thermal expansion between the various elements of the device 40 and therefore no extraneous stress or deflection of the mirror or the driver body.

Figure 4:
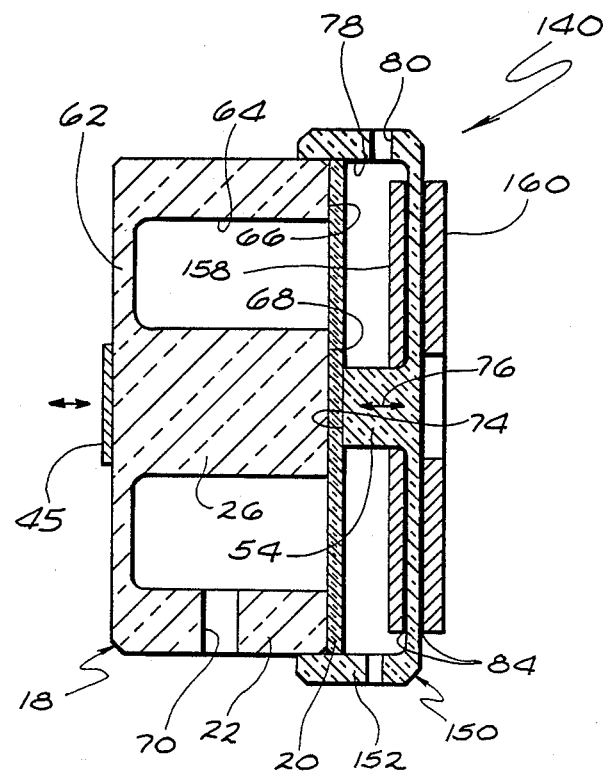
FIG. 4 is a cross-sectional view corresponding to the view of FIG. 3 but showing an alternate embodiment of a path length control device constructed in accordance with the invention.

Referring now to FIG. 4, a path length control device 140 is similar to the control device 40 of FIGS. 1-3, except that it has a driver body 150 with an enlarged peripheral ring 152 which extends over and is rigidly affixed to the exterior cylindrical surface of the mirror assembly 44. Rigid connection is made by adhesive or other suitable means (not shown) and results in a device having larger piezoelectric discs 158 and 160. All other elements of the path length control device 140 are the same as those of the device 40 described above and are given the same reference numbers. Due to the larger piezoelectric discs 158 and 160, the path length control device 140 is able to provide a larger mirror displacement than the device 40 of FIG. 3. With this exception, the path length control device of FIG. 4 operates in the same manner as the device of FIG. 3.

In manufacturing path length control devices according to the present invention, it is necessary to select certain dimensions and operating parameters to suit a particular application. The dimensions of the mirror body 18 and the driver body 20, and especially the membranes of those bodies, are critical in determining the compliance and frequency characteristics of the device. The choice of these dimensions and parameter values can be made in light of the present disclosure in accordance with known principles of mirror and membrane design.

By way of example, the parameters of the following table have been found to be suitable in devices made according to the embodiments of FIGS. 3 and 4, respectively.

|  | Embodiment of FIG. 3 | Embodiment of FIG. 4 |
| --- | --- | --- |
| Material of driver body (50 or 150) | Zerodur (manufactured by Schott Glass Technologies, Inc.) | (same) |
| Outer diameter of driver body (50 or 150) | .800" (20.0 mm) | .931" (24.0 mm) |
| Thickness of peripheral ring (52 or 152) | .049" (1.2 mm) | .063" (1.6 mm) |
| Diameter of inner hub 54 | .125" (3.0 mm) | (same) |
| Thickness of driver membrane 56 | .020" (0.5 mm) | (same) |
| Piezoelectric elements 58 and 60 | Edo Western Corp. Type No. EC-76; Curie Temperature 190° C.; $d_{31}$ constant at 25° C. is $-262 \times 10^{12}$ m/v | (same) |
| Material of mirror body 18 and backing plate 25 | Zerodur | (same) |
| Outside diameter of mirror body 18 | .800" (20.0 mm) | (same) |
| Thickness of cylindrical outer ring 22 | .100" (3.0 mm) | (same) |
| Diameter of central hub 26 | .240" (6.0 mm) | (same) |
| Thickness of mirror membrane 62 | .030" (0.8 mm) | (same) |
| Thickness of backing plate 25 | .022" (0.6 mm) | (same) |
| Adhesive | Epoxy | (same) |

In fabricating the path length control devices 40 and 140, the mirror body and the driver body are each preferably formed of a single homogeneous piece of suitable glass-ceramic material. This is typically done by turning a block of material on a lathe-type machine tool to obtain the desired geometry. Such techniques permit the elements to be machined to very close tolerances, yielding a precision transducer assembly which exhibits low thermal expansion and very low error. In comparison to a potential thermal expansion on the order of 45 microinches (1.143 microns), as encountered with the prior metallic drivers of FIGS. 5A and 5B, thermal expansion of the glass driver body of the present invention is negligible. The resulting device is more efficient in that the driver need not compensate for its own thermal expansion during operation.

From the above, it can be seen that the path length control device of the present invention greatly reduces thermal expansion which must be compensated for by applying a potential to the device and virtually eliminates the problems associated with differential thermal expansion of its components. Furthermore, the device benefits from virtual elimination of thermal stresses on the mirror and from a reduced overall mass.

The appended claims are not limited to the embodiments described herein but rather are intended to cover all variations and adaptations falling within the true scope and spirit of the present invention. For example, the path length control device disclosed and claimed herein is not limited to use in a ring laser gyro but is useful to vary path length in any of a variety of other laser cavities, as well. One such cavity is that of a linear laser in which light impinges substantially perpendicularly on the surface of a path length control mirror. Thus, the invention is applicable broadly to lasers of all types and can be used at any desired angle of beam incidence.

What is claimed is:

1. A device for driving a deflection-type laser mirror of low expansion glass to move a reflective surface of the mirror in a preselected axial direction, comprising:
   a driver comprising a low expansion glass body which matches the mirror in coefficient of thermal expansion and has:
     a membrane portion capable of deflection in the axial direction; and
     a hub portion coupled to the membrane portion to transmit deflection forces to the mirror; and
   at least one transducer mounted to the membrane portion for axial deflection of the membrane portion and the mirror in response to an electrical input.

2. The device of claim 1 wherein:
the driver body is made of glass-ceramic material.

3. The device of claim 1 wherein:
the driver body is made of fused quartz material.

4. A device for driving a deflection-type laser mirror of low expansion glass to move a reflective surface of the mirror in a preselected axial direction, comprising:
   a driver comprising a low expansion glass body which matches the mirror in coefficient of thermal expansion and has:
     a driver membrane portion capable of deflection in the axial direction; and
     a peripheral portion and an inner hub portion extending from one side of the driver membrane portion to engage the mirror in said operative position and transmit deflection forces to the mirror;
   at least one transducer mounted to the driver membrane portion for axial deflection of the driver membrane portion and thus the mirror in response to an electrical input; and
   means for applying an electrical input to the transducer to control deflection of the mirror.

5. The device of claim 4 wherein:
the peripheral portion comprises a substantially continuous ring extending axially from the driver membrane portion to the periphery of the mirror in said operative position; and
the inner hub portion comprises a post extending axially from the driver membrane portion to the center of the mirror in said operative position.

6. The device of claim 4 wherein:
the inner hub portion is attachable rigidly to the mirror structure for transmission of forces in opposite axial directions.

7. The device of claim 6 wherein:
the peripheral portion and the inner hub portion are attachable to the mirror by adhesive means.

8. The device of claim 6 wherein:
the peripheral portion is circularly cylindrical and is coaxial with the inner hub portion.

9. The device of claim 4 wherein:
the driver body is a homogeneous monolithic body.

10. The device of claim 4 wherein:
the driver membrane portion has a pair of major surfaces; and
a transducer is mounted to at least one of said major surfaces.

11. The device of claim 10 wherein:
each transducer is a flat annular member of piezoelectric material substantially coextensive with the major surface to which it is mounted.

12. The device of claim 4 wherein:
a pair of transducers are mounted to opposite surfaces of the driver membrane portion so that application of said electrical input causes one transducer to expand as the other transducer contracts.

13. The device of claim 12 wherein:
the two surfaces of the driver membrane portion are coated with electrically conductive films connected together to act as a common terminal in applying said electrical input; and
the transducers are similar elements mounted to the driver membrane portion with their polarities in the same direction.

14. Apparatus for controlling path length in a laser cavity by movement of a reflective surface, comprising:
   a mirror structure of low expansion glass having a reflective surface portion carried by a mirror membrane for movement in a preselected axial direction upon deflection of said mirror membrane;
   a driver comprising a low expansion glass body which matches the mirror structure in coefficient of thermal expansion and has:
     a driver membrane portion capable of deflection in the axial direction; and
     a peripheral portion and an inner hub portion extending from one side of the driver membrane portion to the mirror structure and individually connected to the mirror structure for transmission of deflection forces;
   at least one transducer mounted to the driver membrane portion for axial deflection of said driver membrane portion and thus the mirror membrane in response to an electrical input; and
   means for applying an electrical input to the transducer to control the position of the reflective surface portion.

15. The apparatus of claim 14 wherein:
the peripheral portion of the driver body comprises a substantially continuous ring extending axially from the driver membrane portion to the periphery of the mirror structure; and
the inner hub portion comprises a post extending axially from the driver membrane portion to the center of the mirror structure.

16. The apparatus of claim 14 wherein:
the inner hub portion is attached rigidly to the mirror structure for transmission of deflection forces in opposite axial directions.

17. The apparatus of claim 14 wherein:
the driver body is a homogeneous monolithic body.

18. The apparatus of claim 14 wherein:

the driver membrane portion has a pair of major surfaces; and a transducer is mounted to at least one of said major surfaces.

19. The apparatus of claim 14 wherein:

the mirror structure comprises a mirror body having an outer ring extending coaxially about a hub; and the outer ring and the hub of the mirror body are joined at one end by the mirror membrane and are linked at another end to the peripheral portion and the inner hub portion, respectively, of the glass driver body.

20. The apparatus of claim 19 wherein:

the mirror structure further comprises a backing plate interposed between the mirror body and the driver body to connect the outer ring of the mirror body to the hub of the mirror body and thereby restrain the hub of the mirror body against radial movement.

21. The device of claim 1 wherein:

the driver body is a homogeneous monolithic body.

* * * * *